(12) United States Patent
Lee et al.

(10) Patent No.: US 11,496,677 B2
(45) Date of Patent: Nov. 8, 2022

(54) SIGNAL CONTROL MODULE AND LOW COHERENCE INTERFEROMETRY

(71) Applicant: National Taiwan University, Taipei (TW)

(72) Inventors: Hsiang-Chieh Lee, Taipei (TW); Ting-Hao Chen, Taipei (TW); Ting-Yen Tsai, Taipei (TW); Chuan-Bor Chueh, Taipei (TW); Yu-Wei Chang, Taipei (TW); Ching-Yu Wang, Taipei (TW)

(73) Assignee: National Taiwan University, Taipei (TW)

( * ) Notice: Subject to any disclaimer, the term of this patent is extended or adjusted under 35 U.S.C. 154(b) by 19 days.

(21) Appl. No.: 17/022,023

(22) Filed: Sep. 15, 2020

(65) Prior Publication Data

US 2022/0078341 A1 Mar. 10, 2022

(30) Foreign Application Priority Data

Sep. 4, 2020 (TW) ................................ 109130350

(51) Int. Cl.
*H04N 5/232* (2006.01)
*G01B 9/0209* (2022.01)
*H04N 5/225* (2006.01)

(52) U.S. Cl.
CPC ....... *H04N 5/23227* (2018.08); *G01B 9/0209* (2013.01); *H04N 5/2256* (2013.01); *H04N 5/23229* (2013.01)

(58) Field of Classification Search
CPC .......... H04N 5/23227; H04N 5/23229; H04N 5/2256; H04N 5/247; G01B 9/0209; G01B 9/02044; G01B 9/02069
See application file for complete search history.

(56) References Cited

U.S. PATENT DOCUMENTS

2005/0231727 A1* 10/2005 Podoleanu ........... G01B 9/0203
356/479
2006/0055939 A1 3/2006 Akiba et al.
(Continued)

FOREIGN PATENT DOCUMENTS

| CN | 106500589 | 3/2017 |
| TW | 200846621 | 12/2008 |

(Continued)

OTHER PUBLICATIONS

Yin-Peng Huang et al., "The Single Software Architecture Supporting Fourier Domain Optical Coherence Tomography System", 2019 IEEE International Conference on BioPhotonics (BioPhotonics), Sep. 17, 2019, pp. 1-11.
(Continued)

*Primary Examiner* — Michael E Teitelbaum
(74) *Attorney, Agent, or Firm* — JCIPRNET

(57) ABSTRACT

A signal control module integrated to a low coherence interferometry including a one-dimensional (1D) array image sensor is provided. The signal control module includes an image acquisition controller and a signal controller. The image acquisition controller sends a 1D image acquisition control signal. The signal controller sends a two-dimensional (2D) image acquisition control signal, wherein the 1D and 2D image acquisition control signals are synchronized with each other. The 1D array image sensor captures 1D image information of an object-to-be-tested at different positions along a direction according to the 1D and 2D image acquisition control signals. The 1D image information constitutes 2D image information. Furthermore, a low coherence interferometry is provided.

17 Claims, 9 Drawing Sheets

(56) References Cited

U.S. PATENT DOCUMENTS

| | | | | |
|---|---|---|---|---|
| 2012/0120407 A1* | 5/2012 | Frisken | ............. | G01B 9/02081 |
| | | | | 356/479 |
| 2018/0317832 A1* | 11/2018 | Scott | ....................... | A61B 3/14 |
| 2020/0226755 A1* | 7/2020 | Shimozato | ........... | A61B 3/1241 |

FOREIGN PATENT DOCUMENTS

| | | |
|---|---|---|
| WO | 2016163719 | 10/2016 |
| WO | 2018000036 | 1/2018 |
| WO | 2019222616 | 11/2019 |
| WO | 2020102912 | 5/2020 |

OTHER PUBLICATIONS

Office Action of Taiwan Counterpart Application, dated Apr. 16, 2021, pp. 1-3.

* cited by examiner

SIGNAL CONTROL MODULE AND LOW COHERENCE INTERFEROMETRY

CROSS-REFERENCE TO RELATED APPLICATION

This application claims the priority benefit of Taiwan application serial no. 109130350, filed on Sep. 4, 2020. The entirety of the above-mentioned patent application is hereby incorporated by reference herein and made a part of this specification.

BACKGROUND

Technical Field

The disclosure relates to a signal control module and a low coherence interferometry.

Description of Related Art

Existing optical coherence tomography technologies are mainly divided into two types, one type is time domain optical coherence tomography (TD-OCT, which is referred to as TD-OCT hereinafter) technology, and the other type is Fourier domain optical coherence tomography (FD-OCT, which is referred to as FD-OCT hereinafter) technology. Compared to TD-OCT, FD-OCT has advantages of a fast image acquisition speed and low system cost, so it is regarded as a mainstream technology of the optical coherence tomography.

The FD-OCT technology is further divided into two types, one type is referred to as a spectral domain optical coherence tomography (SD-OCT) technology, and the other type is referred to as a swept source optical coherence tomography (SSOCT) technology. In the existing SD-OCT technology, if it is required to sense a one-dimensional longitudinal or deeply resolved image at one point on an object-to-be-tested, a light beam first irradiates the point on the object-to-be-tested, and an image acquisition control device sends a one-dimensional image acquisition control signal to inform an image sensor to capture a one-dimensional image of the point. If it is required to sense a two-dimensional image of a cross-section of the object-to-be-tested, a user may issue a two-dimensional image acquisition control signal to notify the image acquisition control device to capture one-dimensional images of different points within a certain time interval, so that during this time interval, the image acquisition control device may continuously send the one-dimensional image acquisition control signal to the image sensor to control the image sensor to capture the one-dimensional images of different points, and finally synthesize these one-dimensional images into a two-dimensional image. However, during the above process, since timings of the externally input two-dimensional image acquisition control signal and the one-dimensional image acquisition control signal do not have a corresponding relationship, a three-dimensional image formed by the two-dimensional images may have image errors (including misalignment or distortion, etc.). Therefore, the above-mentioned non-correspondence timings result in image errors and limit the application of SD-OCT.

SUMMARY

The disclosure is directed to a signal control module, and a low coherence interferometry using the signal control module has good image quality.

The disclosure is directed to a low coherence interferometry, which has good image quality.

An embodiment of the disclosure provides a signal control module integrated to a low coherence interferometry. The low coherence interferometry includes a one-dimensional (1D) array image sensor. The signal control module includes an image acquisition controller and a signal controller. The image acquisition controller is coupled to the 1D array image sensor, and sends a 1D image acquisition control signal to control the 1D array image sensor to capture 1D image information of one point of an object-to-be-tested. The signal controller is coupled to the image acquisition controller, and sends a two-dimensional (2D) image acquisition control signal. The 1D image acquisition control signal and the 2D image acquisition control signal are synchronized with each other, and the 1D array image sensor captures the 1D image information of the object-to-be-tested at different positions along a direction according to the 1D image acquisition control signal and the 2D image acquisition control signal, and the 1D image information corresponding to the different positions constitutes 2D image information of the object-to-be-tested.

An embodiment of the disclosure provides a low coherence interferometry including a low coherence light source, a light splitting and combining element, a reflective element, a scan element, a one-dimensional array image sensor, and the above-mentioned signal control module. The low coherent light source is configured to emit an illumination light beam. The light splitting and combining element is disposed on a transmission path of the illumination light beam. The light splitting and combining element splits the illumination light beam into a reference light beam and an object light beam. The object-to-be-tested is located on a transmission path of the object light beam. The reflective element is disposed on a transmission path of the reference light beam. The scan element is disposed on the transmission path of the object light beam and located between the light splitting and combining element and the object-to-be-tested. The reference light beam is reflected by the reflective element and transmitted to the light splitting and combining element, and the object light beam is sequentially reflected by the scan element and the object-to-be-tested and then transmitted to the light splitting and combining element. The reflected reference light beam and the reflected object light beam are combined by the light splitting and combining element to form a synthesized light beam, wherein the scan element is configured to adjust a position where the object light beam irradiates the object-to-be-tested. The one-dimensional array image sensor is disposed on a transmission path of the synthesized light beam. The image acquisition controller in the above-mentioned signal control module is coupled with the one-dimensional array image sensor, and the signal controller is coupled to the image acquisition controller and the scan element.

Based on the above description, in the signal control module and the low coherence interferometry of the embodiments of the disclosure, the image acquisition controller and the signal controller respectively send one-dimensional and two-dimensional image acquisition control signals that are synchronized with each other in timing. When the one-dimensional array image sensor is controlled by the one-dimensional and two-dimensional image acquisition control signals to capture the image information of the object-to-be-tested, the problem of image error is less likely to occur. Therefore, the low coherence interferometry of the embodiment of the disclosure has good image quality, and also helps to improve a dynamic range of OCT angiography (OCTA).

DESCRIPTION OF THE EMBODIMENTS

Figure 1A:
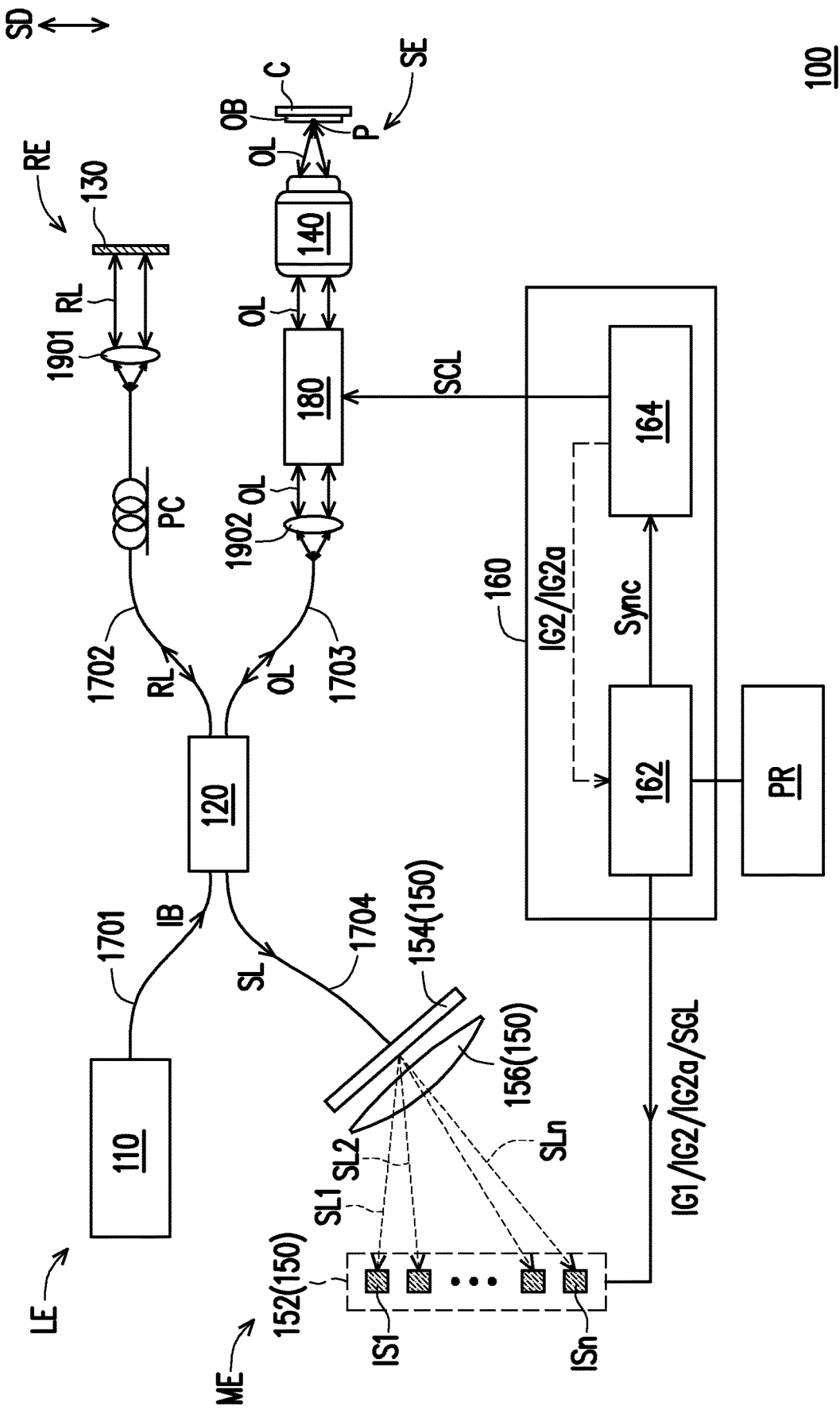
FIG. 1A is a structural schematic diagram of a low coherence interferometry according to an embodiment of the disclosure.
Figure 1B:
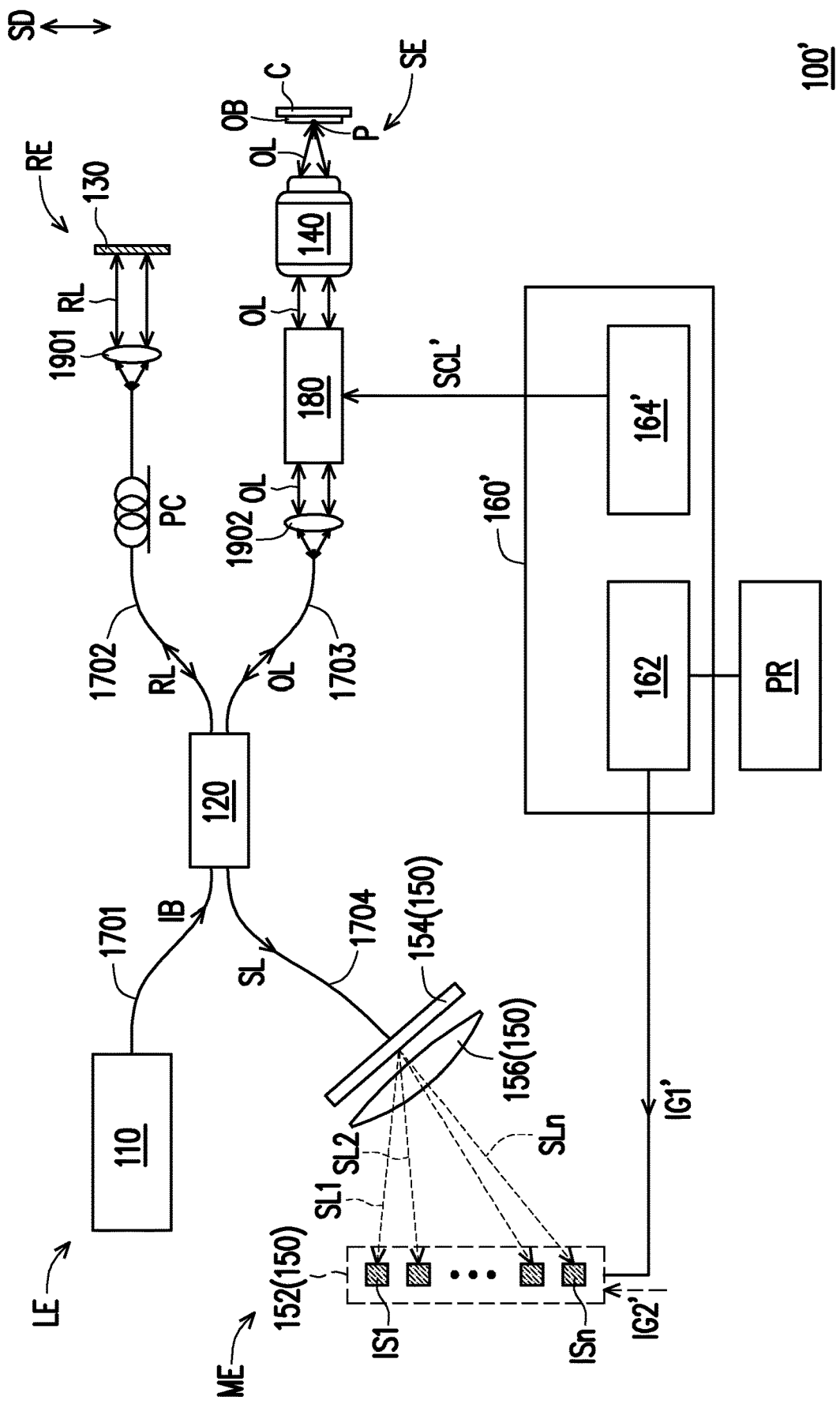
FIG. 1B is a structural schematic diagram of a low coherence interferometry of a comparative embodiment.
Figure 2:
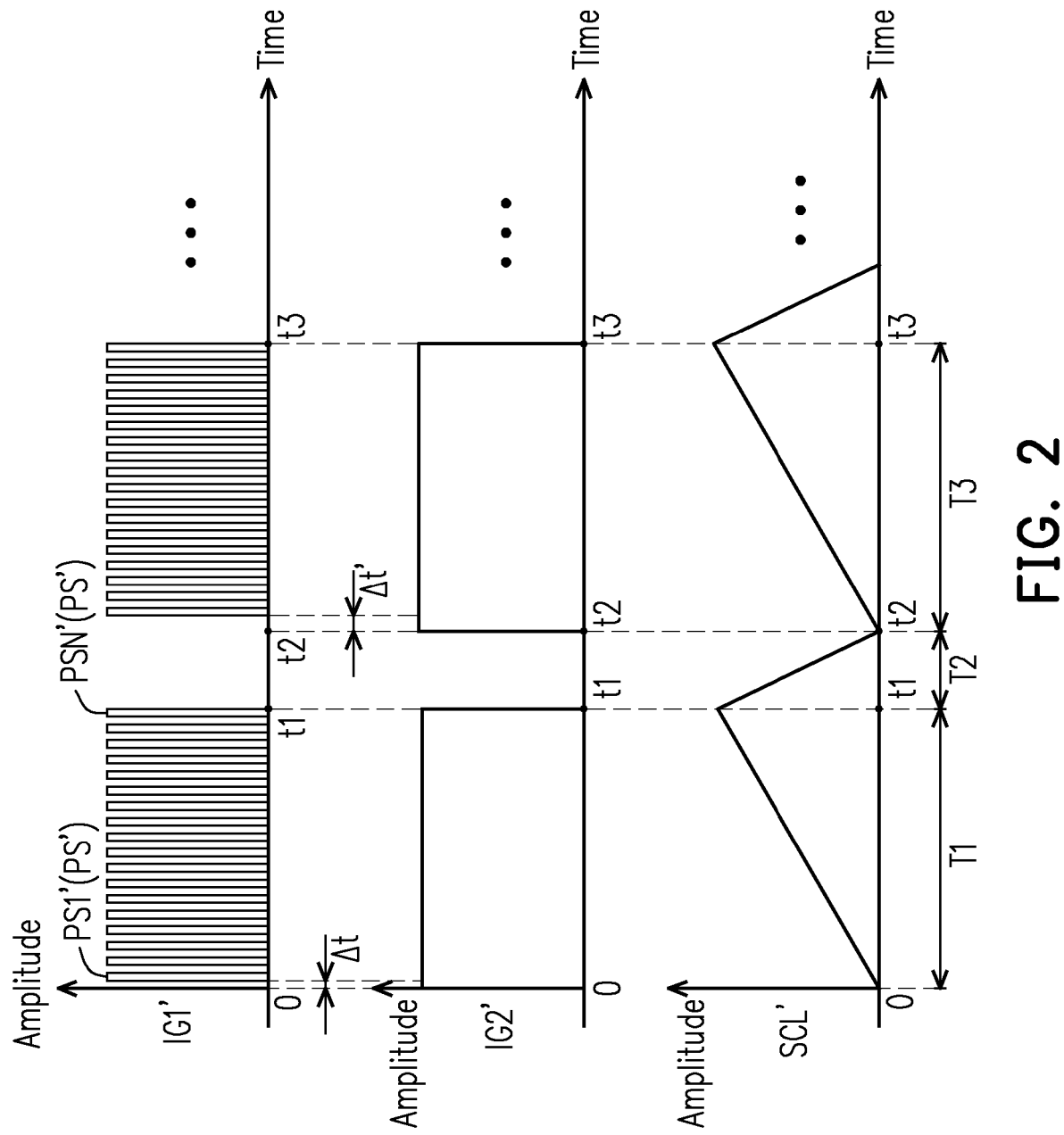
FIG. 2 is a timing diagram of a 1D image acquisition control signal and a 2D image acquisition control signal in the comparative embodiment.
Figure 3A:
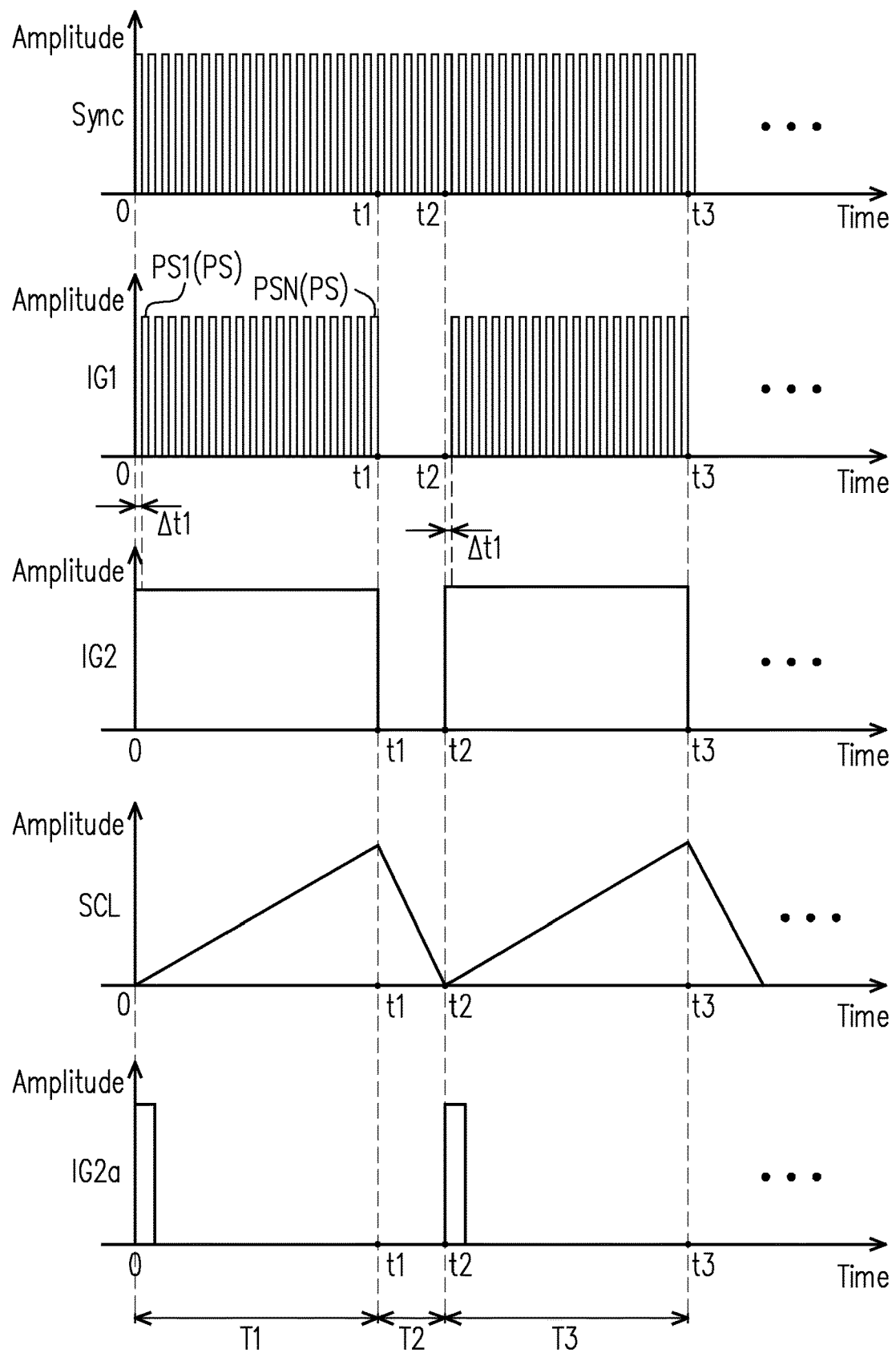
FIG. 3A is a timing diagram of a 1D image acquisition control signal and a 2D image acquisition control signal in an embodiment of the disclosure.
Figure 3B:
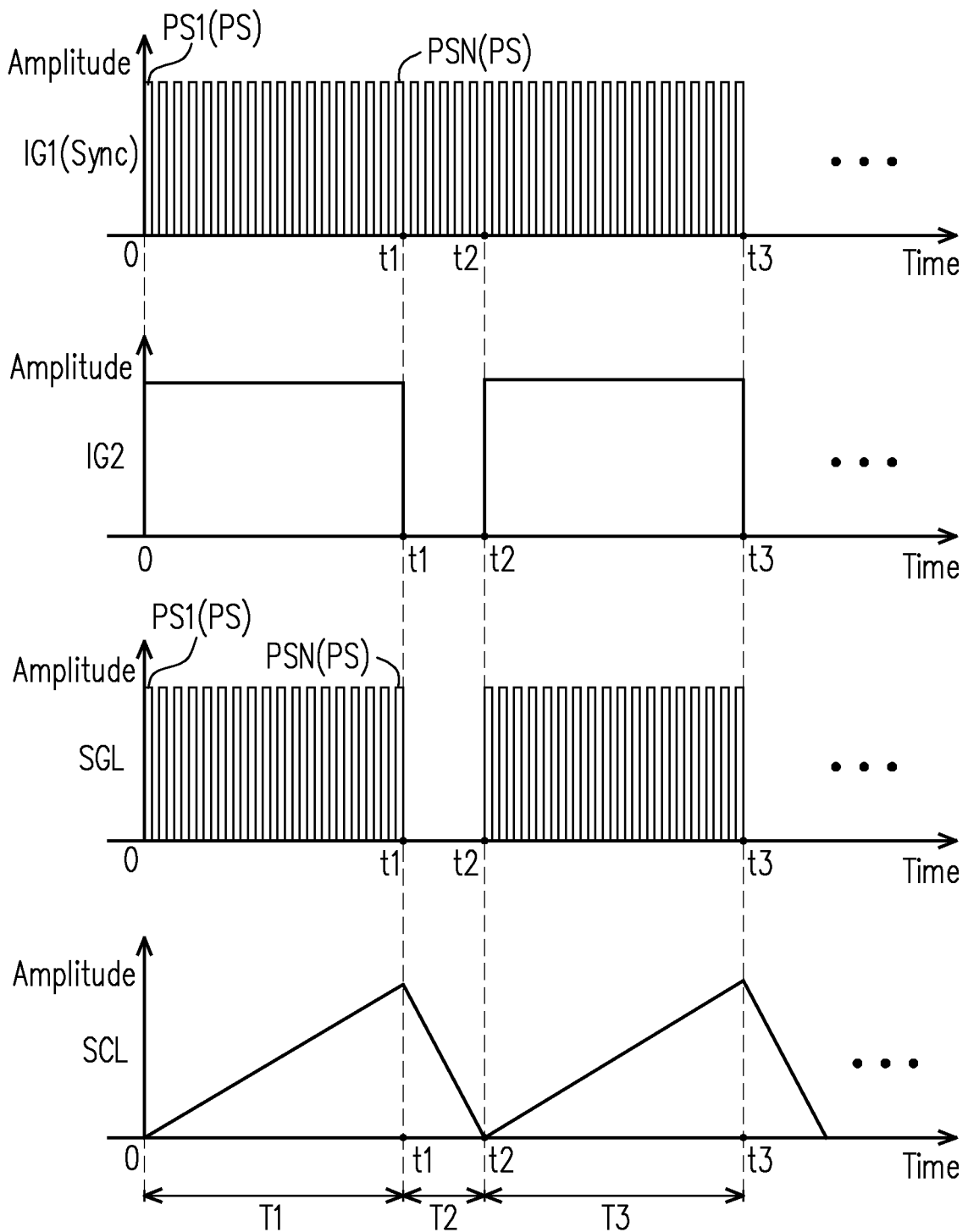
FIG. 3B is a timing diagram of a 1D image acquisition control signal, a 2D image acquisition control signal and a synthesized image acquisition control signal of another embodiment of the disclosure.
Figure 4:
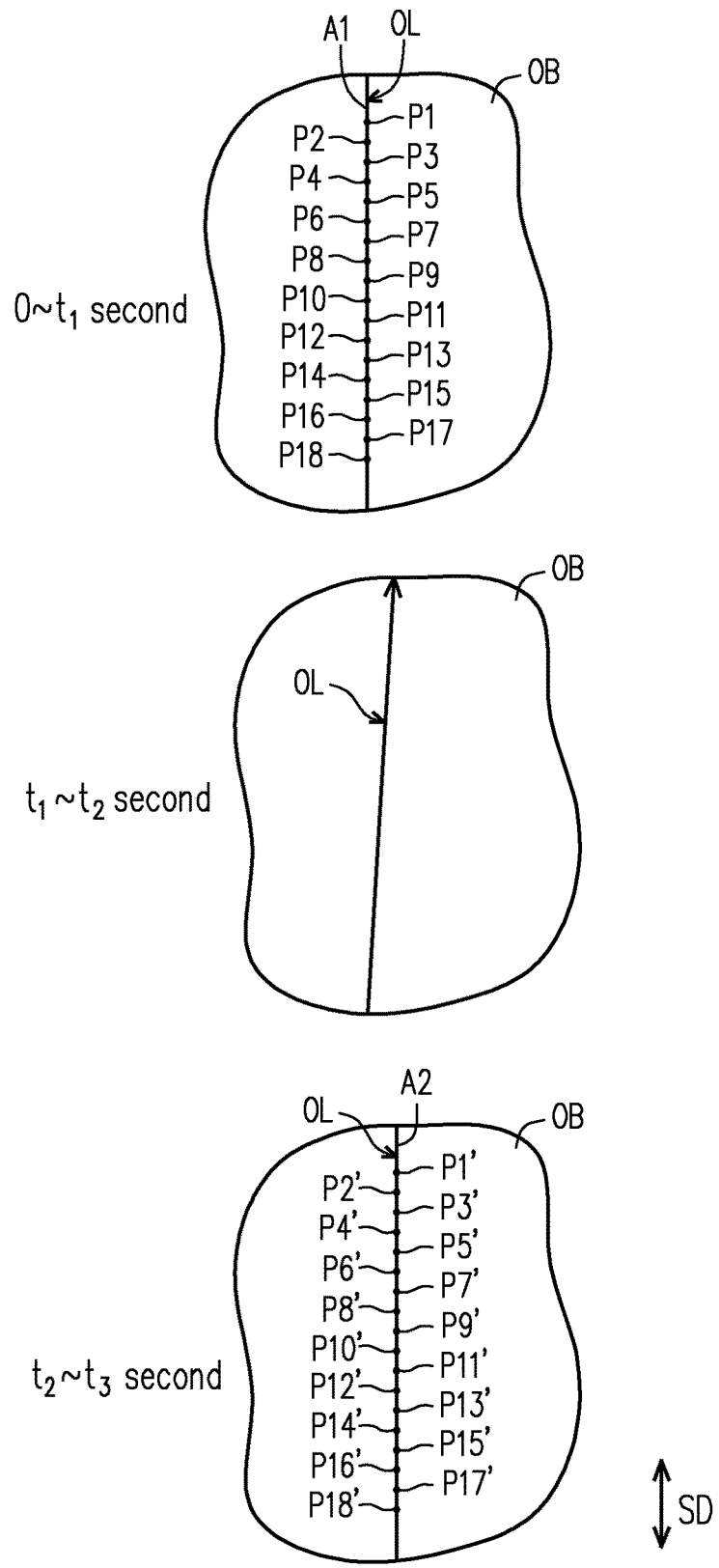
FIG. 4 is a schematic diagram of different cross-sections of an object-to-be-tested irradiated by an object light beam along a scan direction.

FIG. 1A is a structural schematic diagram of a low coherence interferometry according to an embodiment of the disclosure. FIG. 1B is a structural schematic diagram of a low coherence interferometry of a comparative embodiment. FIG. 2 is a timing diagram of a 1D image acquisition control signal and a 2D image acquisition control signal in the comparative embodiment. FIG. 3A is a timing diagram of a 1D image acquisition control signal and a 2D image acquisition control signal in an embodiment of the disclosure. FIG. 3B is a timing diagram of a 1D image acquisition control signal, a 2D image acquisition control signal and a synthesized image acquisition control signal of another embodiment of the disclosure. FIG. 4 is a schematic diagram of different cross-sections of the object-to-be-tested irradiated by an object light beam along a scan direction.

Referring to FIG. 1A, in the embodiment, a low coherence interferometry 100, for example, adopts the SD-OCT technology to sense image information of an object-to-be-tested OB, where the object-to-be-tested OB is, for example, a human tissue, but the disclosure is not limited thereto. The low coherence interferometry 100 includes a low coherence light source 110, a light splitting and combining element 120, a reflective element 130, an objective lens 140, a spectrometer 150, a signal control module 160, a plurality of light transmission elements 1701-1704, a scan element 180, collimating lenses 1901 and 1902, a polarization controller PC and a processor PR. In the embodiment, the low coherence interferometry 100 is, for example, based on a frame work of a Michelson interferometer. In other embodiments, a framework of a Mach-Zehnder interferometer, a Linnik interferometer, or a Mirau interferometer may also be adopted, but the disclosure is not limited thereto. The above components will be explained in detail in the following paragraphs.

The low coherence light source 110 is configured to emit an illumination light beam IB, and types thereof may include light emitting diode (LED), Superluminscent LED, short pulse laser light source (short pulse laser), or other suitable light-emitting elements, which have a characteristic of wide bandwidth. In the embodiment, since the low coherence interferometry 100 is used to measure human tissues, a waveband of a main light-emitting wavelength of the low coherence light source 110 is a visible light waveband (390 nm to 700 nm) or a near-infrared light waveband (700 nm to 1700 nm) that does not harm the human body, where a central wavelength refers to a wavelength corresponding to the strongest light intensity in a light intensity spectrum of the low coherence light source 110. In other embodiments, those skilled in the art may also select an appropriate central wavelength of the low coherence light source 110 according to a different object-to-be-tested OB, and the disclosure is not limited thereto.

The light splitting and combining element 120 is an optical element capable of combining a plurality of light beams transmitted on different optical paths into one light beam for outputting (a light combining function) and dividing one light beam into a plurality of light beams transmitted on different optical paths (a light splitting function). In the embodiment, the light splitting and combining element 120 is, for example, a 50/50 fiber coupler, namely, it may evenly distribute the light beam incident to the 50/50 fiber coupler to two output terminals 1702 and 1703 at a 50:50 light splitting ratio to implement light splitting. Conversely, if light beams with different incident directions are incident to the light splitting and combining element 120, the light beams may be combined by the light splitting and combining element 120 to form a synthesized light beam.

The reflective element 130 is an optical element with a reflective function, and is, for example, a metal block in the embodiment. A material of the metal block is, for example, gold (i.e., a gold mirror), silver (i.e., a silver mirror). In other embodiments, the reflective element 130 may also be an element coated with a reflective object with high reflectivity on the surface, which is not limited by the disclosure.

The objective lens 140 is a lens used to guide the light beam to the object-to-be-tested OB, which is composed of, for example, one or more lenses with refractive powers, and the disclosure is not limited thereto.

The spectrometer 150 includes a diffraction grating 154, a 1D array image sensor 152, and a focusing lens 156. In the embodiment, a main function of the diffraction grating 154 is light splitting, and a pattern thereof is, for example, a transmissive diffraction grating that may transmit light beams. In other embodiments, the diffraction grating 154 may also be a reflective diffraction grating that reflects the light beams, which is not limited by the disclosure. The 1D array image sensor 152 includes a plurality of image sensing elements IS1-ISn (which are also referred to as line scan cameras) arranged in a single direction. The image sensing elements IS1-ISn include complementary metal-oxide-semiconductor (CMOS) type image sensing elements or charge-coupled device (CCD) type image sensing elements, but the disclosure is not limited thereto. The focusing lens 156 is, for example, a convex lens and is selectively provided, but the disclosure is not limited thereto.

The signal control module 160 includes an image acquisition controller 162 and a signal controller 164 that are coupled to each other, and in the embodiment, the image acquisition controller 162 and the signal controller 164 respectively belong to different chips. The image acquisition controller 162, for example, has an image acquisition circuit in internal and sends an image acquisition control signal to control the 1D array image sensor 152 to capture image information. The signal controller 164 is, for example, used to adjust the signal of the image acquisition controller 162. In the embodiment, the image acquisition controller 162 is, for example, a frame grabber card, where in addition to controlling the 1D array image sensor 152 to capture images, the frame grabber card further has image preprocessing capability, where the image preprocessing includes OCT interferometric demodulation such as wavenumber calibration (or k calibration), dispersion compensation, fast Fourier transform (FFT), and other image processing. In addition, the image preprocessing function may accelerate a speed of the above-mentioned image processing by building a FPGA chip in the frame grabber card or through a coordinated computation with a GPU card. The signal controller 164 is, for example, a data acquisition card (DAQ card).

The light transmission elements 1701-1704 are, for example, optical elements that may transmit light beams therein, and a type thereof is, for example, optical fiber, but the disclosure is not limited thereto.

The scan element 180 refers to a mechanism element that may change an irradiation position of the light beam on the object-to-be-tested OB. In the embodiment, the scan element 180 includes two galvanometer mirrors (which are also referred to as galvanometers) arranged in perpendicular to each other, which are respectively referred to as a first galvanometer mirror and a second galvanometer mirror, and each galvanometer mirror has a rotating shaft, and is adapted to vibrate back and forth along the rotating shaft. In another embodiment, the scan element 180 may also include a galvanometer mirror and a displacement module used for displacing the galvanometer mirror in a 2D plane. In another embodiment, the scan element is, for example, a MEMS mirror that may rotate in two different directions, which is not limited by the disclosure.

The collimating lenses 1901 and 1902 are, for example, lenses adapted to collimate light beams.

The polarization controller PC is used to correct a change of a polarization state of a light beam caused by the light transmission element 1702 itself, for example, to eliminate a polarization state error by controlling an azimuth angle or retardation of the light beam in the light transmission element 1702, so as to improve interference efficiency of the light splitting and combining element 120. In the embodiment, the polarization controller PC is only disposed on the light transmission element 1702. In other embodiments, polarization controllers may also be provided on other light transmission elements according to actual requirements, which is not limited by the disclosure.

The processor PR is, for example, a device that may perform different operations on signals. In the embodiment, the processor PR is, for example, a computer, but the disclosure is not limited thereto.

Configuration relationships of the above-mentioned components will be described in detail in the following paragraphs.

Referring to FIG. 1A, according to different functions, the low coherence interferometry 100 of the embodiment is mainly divided into four ends, which are respectively a light source end LE, a reference end RE, a sample end SE, and a measurement end ME (or referred to as a detection end), and the light splitting and combining element 120 is located among the four ends. The light source end LE includes the low coherence light source 110. The reference end RE includes the polarization controller PC, the collimating lens 1901 and the reflective element 130. The sample end SE includes the collimating lens 1902, the objective lens 140, the scan element 180, and a carrier C for setting the object-to-be-tested OB. The measurement end ME includes the spectrometer 150.

In detail, the four ends implement optical coupling with each other through the light transmission elements 1701-1704. The low coherence light source 110 is connected to the light splitting and combining element 120 through the light transmission element 1701. The polarization controller PC of the reference end RE is connected to the light splitting and combining element 120 through the light transmission element 1702, and the collimating lens 1901 is disposed downstream of an optical path of the polarization controller PC, and the reflective element 130 is disposed downstream of an optical path of the collimating lens 1901. The collimating lens 1902 of the sample end SE is connected to the light splitting and combining element 120 through the light transmission element 1703, and the scan element 180 is located downstream of an optical path of the collimating lens 1902, the objective lens 140 is located downstream of an optical path of the scan element 180, the object-to-be-tested OB is set on the carrier C, and the object-to-be-tested OB is located downstream of an optical path of the objective lens 140. The diffraction grating 154 of the measurement end ME is connected to the light splitting and combining element 120 through the light transmission element 1704, and the 1D array image sensor 152 is located downstream of an optical path of the diffraction grating 154.

Moreover, the signal control module 160 is respectively connected to the scan element 180 of the sample end SE and the 1D array image sensor 152 of the measurement end ME. In detail, the image acquisition controller 162 is coupled to the 1D array image sensor 152, and the signal controller 164 is connected to the scan element 180.

An operation principle of the low coherence interferometry 100 of the embodiment will be described in detail in the following paragraphs.

Referring to FIG. 1A, first, in the embodiment, the low coherence light source 110 emits an illumination light beam B3. The illumination light beam B3 is transmitted to the light splitting and combining element 120 by the light transmission element 1701. The light splitting and combining element 120 divides the illumination light beam B3 into two light beams transmitted on different optical paths, where one of the light beams is a reference light beam RL directed to the reference end RE, and the other one of the light beams is an object light beam OL directed to the sample end SE, and optical paths of the reference light beam RL and the object light beam OL are respectively described below.

The reference light beam RL is transmitted to the collimating lens 1901 through the light transmission element 1702. During the transmission process, the polarization controller PC may correct a change of a polarization state of the reference light beam RL caused by the light transmission element 1702 itself to eliminate the polarization state error. Then, the reference light beam RL is collimated by the collimating lens 1901, and is transmitted to and reflected by the reflective element 130. The reflected reference light beam RL returns to the light splitting and combining element 120 along the original optical path.

The object light beam OL is transmitted to the collimating lens 1902 through the light transmission element 1703. Then, the object light beam OL is collimated by the collimating lens 1902 and then transmitted to the scan element 180. After the object light beam OL is reflected by the scan element 180, it is focused by the objective lens 140 to focus on the object-to-be-tested OB. The object light beam OL is reflected by the object-to-be-tested OB to carry image information of the object-to-be-tested OB, and the reflected object light beam OL returns to the light splitting and combining element 120 along the original optical path.

After the reflected reference light beam RL and the reflected object light beam OL return to the light splitting and combining element 120, they are combined by the light splitting and combining element 120 to form a synthesized light beam SL. Since the synthesized light beam SL is a broadband light beam, when the synthesized light beam SL is transmitted to the spectrometer 150 through the light transmission element 1704, it is diffracted by the diffraction grating 154, and the synthesized light beam SL is divided into sub-light beams SL1-SLn with different central wavelengths, and the sub-light beams SL1-SLn penetrate through the focusing lens 156 and are transmitted to each of the image sensing elements IS1-ISn on the 1D array image sensor 152, and the image sensing elements IS1-ISn receive light intensities and phase information of each of the central wavelengths from a short wavelength to a long wavelength. In addition, since the synthesized light beam SL is formed by combining the reference light beam RL and the object light beam OL, the synthesized light beam SL may form a light interference pattern on the 1D array image sensor 152.

In the following paragraphs, a low coherence interferometry 100' of a comparative embodiment is compared with the low coherence interferometry 100 of the embodiment to highlight the technical effects of the embodiment.

Referring to FIG. 1A, FIG. 1B, FIG. 2 and FIG. 3A, in the embodiment and the comparative embodiment, when a point on the object-to-be-tested OB is detected (i.e., A-scan is performed), the scan element 180 controls the first and second galvanometer mirrors not to vibrate, so that the object light beam OL reflected by the scan element 180 may irradiate one point on the object-to-be-tested OB. At this time, the image acquisition controller 162 sends 1D image acquisition control signals IG1', IG1 (as shown in FIG. 2 and FIG. 3A, which are respectively composed of a plurality of pulse signals PS', PS) to inform the 1D array image sensor 152 to capture a light interference pattern of this point and convert the light interference pattern into electrical signals (1D image information), where the 1D array image sensor 152 captures the 1D image information of this point at a rising or falling time of each of the pulse signals PS', PS, and then transmits the 1D image information of this point to the image acquisition controller 162, where transition of a signal from a low level to a high level is referred to as a rising edge of the signal and a time corresponding to the rising edge is referred to as the rising time. Conversely, transition of the signal from the high level to the low level is referred to as a falling edge of the signal and a time corresponding to the falling edge is referred to as the falling time.

When a cross-section A1 on the object-to-be-tested OB is detected (i.e., B-scan is performed), description is made in the following paragraphs in two parts according to the timing diagram of different signals of the comparative embodiment of FIG. 2 and the timing diagram of different signals of the embodiment of FIG. 3A.

First, the comparative embodiment is described, referring to FIG. 1B in collaboration with FIG. 2, in the comparative embodiment, if the B-scan is to be performed, the image acquisition controller 162 may send a 1D image acquisition control signal IG1' to the 1D array image sensor 152. A 2D image acquisition control signal IG2' is provided by an external chip (not shown) to inform the 1D array image sensor 152 to capture 1D image information within a certain time interval. The signal controller 164' also sends a scan element control signal SCL' to the scan element 180 to control an operation of the scan element 180. In the following paragraphs, a first, a second, and a third time intervals T1-T3 are divided to respectively describe operations of different elements, where the first, the second, and the third time intervals T1-T3 are respectively 0-t1 seconds, t1-t2 seconds, and t2-t3 seconds.

In the first time interval T1, the 2D image acquisition control signal IG2' is used to inform the 1D array image sensor 152 to capture 1D image information within a certain time interval, where since an amplitude value of the 2D image acquisition control signal IG2' is greater than zero, the first time interval T1 is a turn-on time interval of the 2D image acquisition control signal IG2'. Therefore, the 1D array image sensor 152 captures the 1D image information of different points of the object-to-be-tested OB within an overlapped time interval of the 1D and the 2D image acquisition control signals IG1' and IG2'. Meanwhile, the first time interval T1 is also a time interval corresponding to the intensity of the scan element control signal SCL' varied from 0 to a positive extreme, and the scan element 180 is controlled within this time interval to make the first galvanometer mirror not to vibrate, and make the second galvanometer mirror to rotate in one direction, so that in the first time interval T1, the object light beam OL irradiates on a surface of the object-to-be-tested OB along a scan direction SD due to the rotation of the second galvanometer mirror, as shown in an upper part of FIG. 4, and each of the points P1-P18 in the upper part of FIG. 4 respectively corresponds to the pulse signals PS1'-PSN'. To be more specific, in a time interval of each pulse signal PS', the 1D array image sensor 152 captures the 1D image information of the corresponding point. For example, during the time interval of the first pulse signal PS1, the 1D array image sensor 152 captures the 1D image information of the point P1, and the others may be deduced by analogy. The 1D image information of the different points P1-P18 constitutes 2D image information of the cross-section A1. It should be noted that those with ordinary knowledge in the art may adjust the number of the above-mentioned multiple points according to their own needs, which is not limited by the disclosure.

Then, in the second time interval T2, the 1D and 2D image acquisition control signals IG1' and IG2' are all in a turn-off time interval, so that the 1D array image sensor 152 does not capture images, and the intensity of the scan element control signal SCL' is varied from the positive extreme to 0, and the scan element 180 is controlled by the scan element control signal SCL' within this time interval to make the first galvanometer mirror to slightly shift, and make the second galvanometer mirror to rotate in an opposite direction. Therefore, in the second time interval T2, the object light beam OL irradiates along the surface of the object-to-be-tested OB due to the rotation of the first and second galvanometer mirrors, i.e., travels from the bottom of the cross-section A1 to the top of the cross-section A1, as shown in a middle part of FIG. 4.

Then, in the third time interval T3, a next cross-section A2 is started to be captured, and a method thereof is similar to the method of capturing the cross-section A1, so that detail thereof is not repeated. Therefore, in the third time interval T3, the object light beam OL may irradiate the object-to-be-tested OB on the cross-section A2 along the scan direction SD, and the 1D array image sensor 152 may be controlled by the 1D and 2D image acquisition control signal IG1', IG2' to capture the 1D image information of the different points P1'-P18', as shown in a lower part of FIG. 4. After the above process is performed by multiple times, the object light beam OL scans the entire object-to-be-tested OB to obtain 3D image information.

However, since the image acquisition controller 162 and the external chip respectively belong to different chips, timings of signals sent by the different chips are related to timings of corresponding baseband signals, and the 1D and 2D image acquisition control signal IG1', IG2' sent by the image acquisition controller 162 and the external chip are not synchronized in timing due to the different baseband signals, where the so-called "not synchronized in timing" means that a start time difference Δt between a first group of the 1D and 2D image acquisition control signals IG1' and IG2' of the first time interval T1 in FIG. 2 is different from a start time difference Δt' between another group (for example, a second group of the second time interval T2) of the 1D and 2D image acquisition control signals IG1' and IG2', which leads to a problem of image error (including misalignment or distortion, etc.) in the subsequent image combination of 2D images generated from the cross-sections A1 and A2. In addition, since the signal controller 164' and the image acquisition controller 162 also respectively belong to different chips, timings of the scan element control signal SCL' and the 1D image acquisition control signal IG1' are also not synchronized, and the operation of the scan element 180 is not complied with an image acquisition timing of the 1D array image sensor 152, which may also cause image errors.

Comparatively, referring to FIG. 1A and FIG. 3A, compared with the comparative embodiment, a main difference of the embodiment is that the image acquisition controller 162 may send a synchronization signal Sync to the signal controller 164. The signal controller 164 may receive the synchronization signal Sync through a transmission interface, and the transmission interface may be a programmable function interface (PFI), but the disclosure is not limited thereto. The signal controller 164 then sends a 2D image acquisition control signal IG2 (a timing relationship thereof is shown in FIG. 3A) to the image acquisition controller 162 according to the synchronization signal Sync and sends a scan element control signal SCL (a timing relationship thereof is shown in FIG. 3A) to the scan element 180. Since the synchronization signal Sync and the 1D image acquisition control signal IG1 are all from the same image acquisition controller 162, the two signals Sync and IG1 are synchronized with each other in timing. The signal controller 164 generates the 2D image acquisition control signal IG2 according to the synchronization signal Sync, so that the timing of the 2D image acquisition control signal IG2 is synchronized with the synchronization signal Sync, and is accordingly synchronized with the timing of the 1D image acquisition control signal IG1. Taking the 1D and 2D image acquisition control signals IG1 and IG2 of FIG. 3A as an example, the so-called "synchronized with each other in timing" means that: a start time difference Δt1 between a first group of the 1D and 2D image acquisition control signals IG1 and IG2 is the same with a start time difference Δt1 between another group (for example, a second group) of the 1D and 2D image acquisition control signals IG1 and IG2, so that when the 1D array image sensor 152 is controlled by the 1D and 2D image acquisition control signals IG1 and IG2 that are synchronized with each other in timing to capture image information of different cross-sections, the problem of image error is less likely to occur. Therefore, the low coherence interferometry 100 of the embodiment of the disclosure has good image quality.

Referring to FIG. 3B, FIG. 3B is another signal control method of the disclosure, and a main difference thereof is that in the embodiment, the synchronization signal Sync and the 1D image acquisition control signal IG1, for example, have a same waveform. When the image acquisition controller 162 receives the 2D image acquisition control signal IG2 from the signal controller 164, the image acquisition controller 162 may perform a signal synthesis step with the 1D image acquisition control signal IG1 sent by itself, where a synthesis method is to, for example, perform a multiplication or logic operation on the 1D and 2D image acquisition control signals IG1 and IG2. After the above step is performed, since the 2D image acquisition control signal IG2 is generated based on the synchronization signal Sync, the two signals IG2 and Sync are synchronized with each other in timing. In addition, a synthesized image acquisition control signal SGL is formed by synthesizing the 1D and 2D image acquisition control signals IG1 and IG2 that are synchronized with each other in timing. Therefore, when the 1D array image sensor 152 is controlled by the synthesized image acquisition control signal SGL to capture the image information of the different cross-sections A1 and A2 of the object-to-be-tested OB, the problem of image error will not occur.

Moreover, since in the embodiments of FIG. 3A and FIG. 3B, the signal controller 164 also sends the scan element control signal SCL to the scan element 180 according to the synchronization signal Sync, the scan element control signal SCL is also synchronized with the 1D and 2D image acquisition control signals IG1 and IG2, which helps a scan process of the scan element 180 to be synchronized with an image capturing process of the 1D array image sensor 152.

Moreover, in the aforementioned embodiment, a turn-on time interval of the 2D image acquisition control signal IG2 covers the 1D image acquisition control signal IG1, and the 1D array image sensor 152 may perform image capturing operations within an overlapped time interval of the 1D and 2D image acquisition control signals IG1 and IG2. In other embodiments, a pattern of a 2D image acquisition control signal IG2a shown in FIG. 3A may also be adopted. In the embodiment, the 2D image acquisition control signal IG2a is used as a trigger signal to start capturing 2D image data, and the number of the pulse signals PS in the 1D image acquisition control signal IG1 within the first time interval T1 is determined. Taking the 1D and 2D image acquisition control signals IG1 and IG2a of FIG. 3A as an example, a user may inform the 1D array image sensor 152 to capture image information of a certain cross-section on the object-to-be-tested OB through an input interface, and after the 1D array image sensor 152 receives the 2D image acquisition control signal IG2a, the 1D array image sensor 152 learns to capture the image information of the certain cross-section on the object-to-be-tested OB, and capture the image information at the rising or falling time of the multiple pulse signals of the 1D image acquisition control signal IG1, and other time intervals may be deduced by analogy, which is not limited by the disclosure.

It should be noted that the optical framework of the aforementioned embodiment is only an example, and those skilled in the art may adjust the number and placement of each optical element according to their needs, which is not limited by the disclosure.

It should be noted that a part of contents of the aforementioned embodiment is also used in the following embodiment, and descriptions of the same technical contents are omitted. The aforementioned embodiment may be referred for descriptions of the omitted parts, and detailed descriptions thereof are not repeated in the following embodiment.

Figure 5:
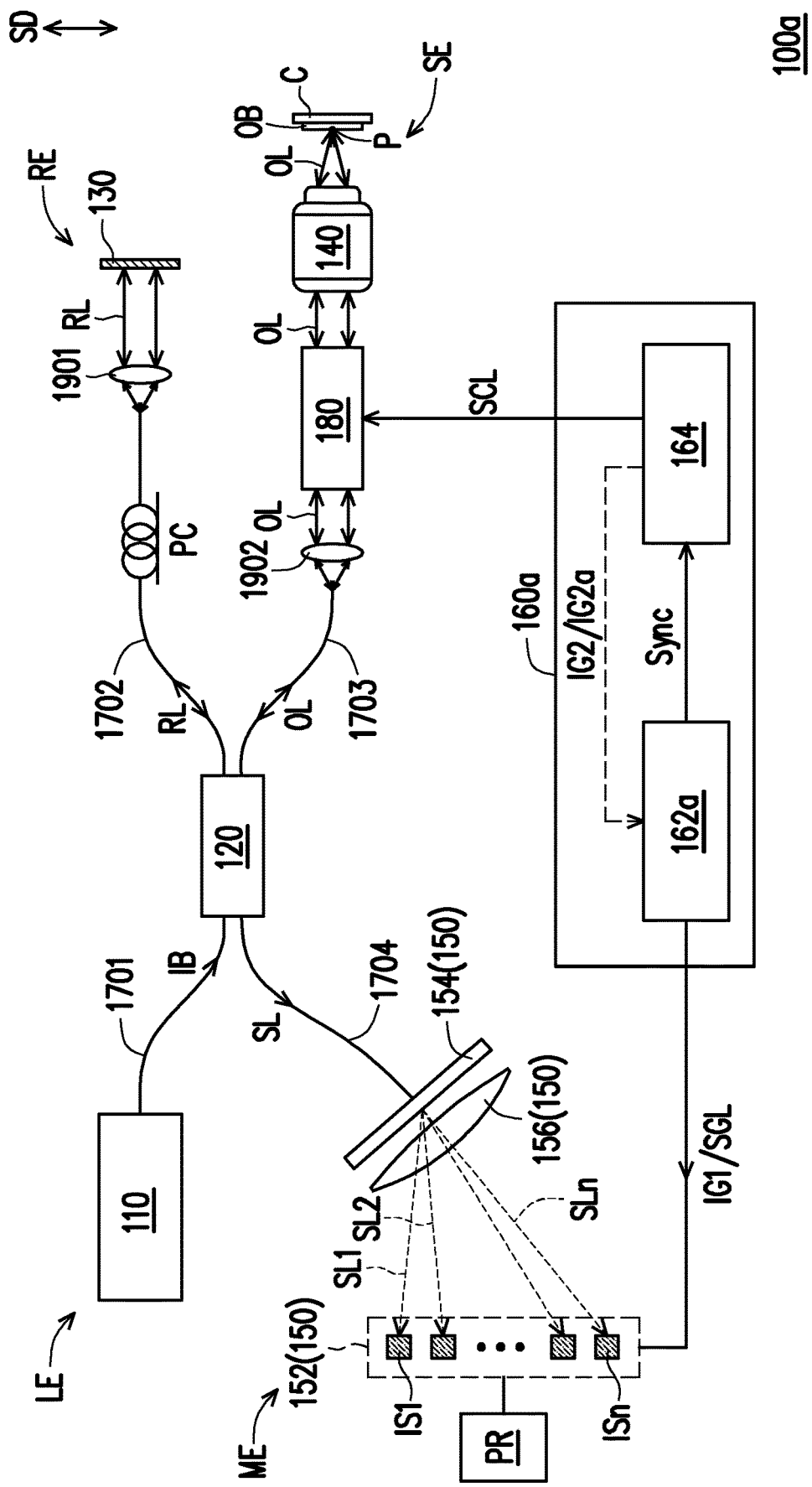
FIG. 5 to FIG. 7 are structural schematic diagrams of low coherence interferometrys according to different embodiments of the disclosure.
Figure 6:
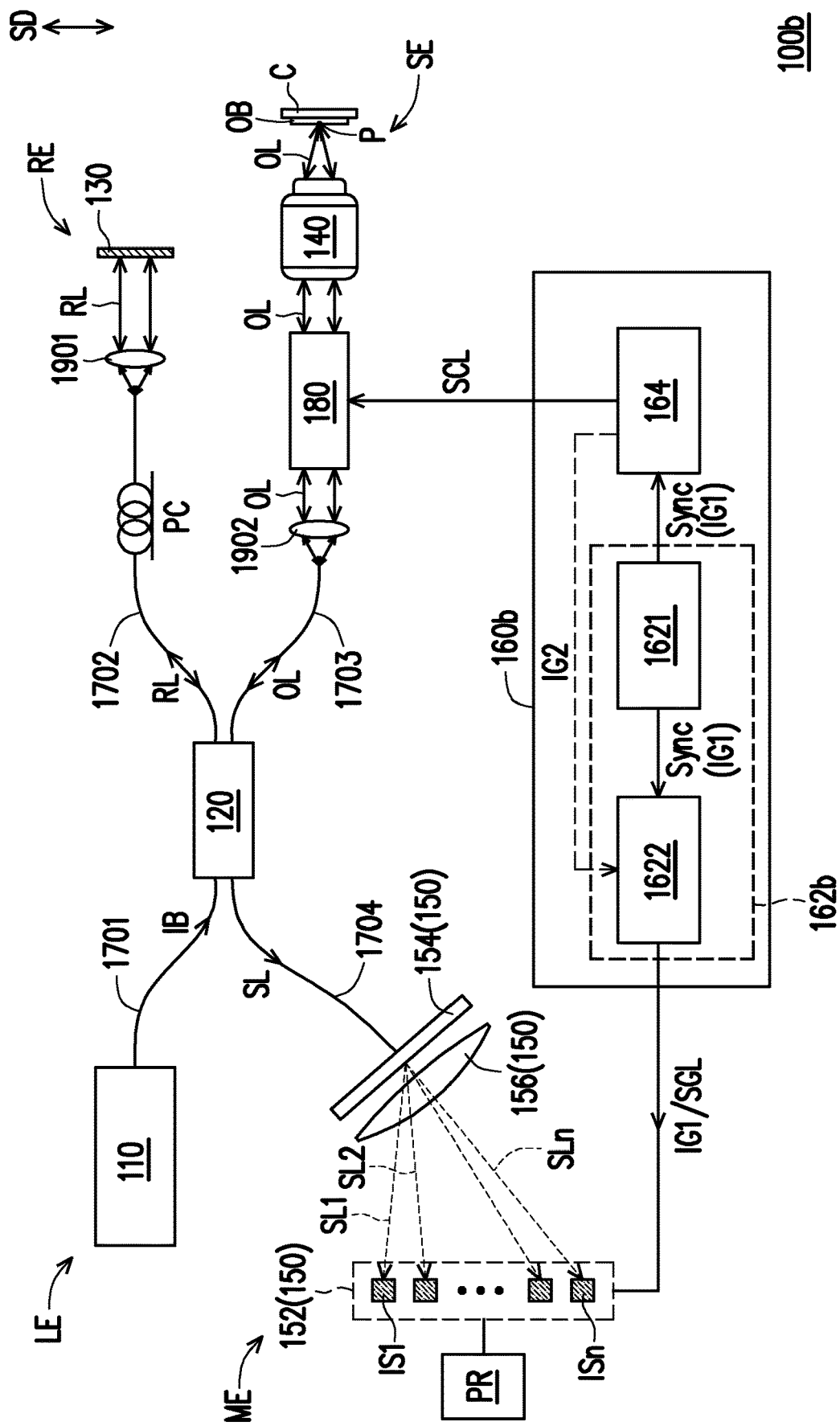
Figure 7:
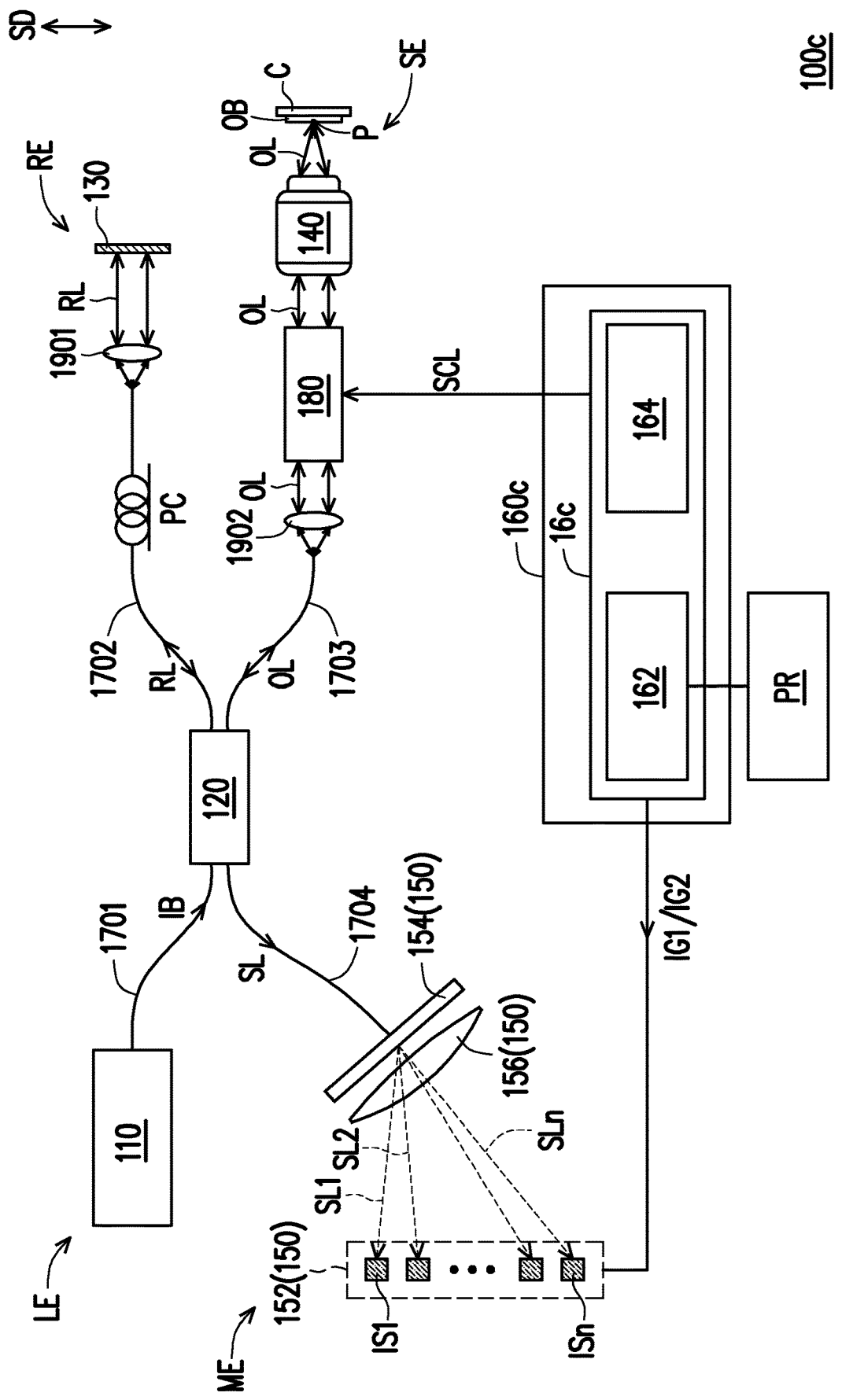

FIG. 5 to FIG. 7 are structural schematic diagrams of low coherence interferometrys according to different embodiments of the disclosure.

Referring to FIG. 5, a low coherence interferometry 100*a* of FIG. 5 is substantially similar to the low coherence interferometry of FIG. 1, and a main difference there between is that in the low coherence interferometry 100*a*, a pattern of the image acquisition controller 162*a* used in the signal control module 160*a* is a micro controller capable of generating signals, such as a single-chip microcontroller or a multi-chip microcontroller, where the single-chip microcontroller refers to a signal generator, a central processing unit, an analog-to-digital converter (ADC), a memory, a timer/counter, various input and output interfaces, etc., integrated in one integrated circuit chip, or in another embodiment, the single-chip microcontroller only includes the above-mentioned signal generator. On the other hand, the multi-chip microcontroller is an integrated controller formed by respectively configuring the above-mentioned elements with different functions (the signal generator, the central processing unit, the ADC, etc.) on different chips, and disposing these chips on a substrate in an adhesive manner. In addition, the 1D array image sensor 152 is connected to the processor PR.

In the following paragraphs, differences between scanning and image acquisition of the low coherence interferometrys 100 and 100*a* of the embodiments of FIG. 1A and FIG. 5 will be described in detail.

The methods of scanning and image acquisition of the low coherence interferometry 100*a* of FIG. 5 are substantially similar to that of the low coherence interferometry 100 of FIG. 1A, and a main difference there between is that the image acquisition controller 162*a* of the microcontroller type does not have the image preprocessing capability compared with the image acquisition controller 162 of the frame grabber card type, and an effect thereof is mainly to control the 1D array image sensor 152 to capture image information, so that its cost is lower than that of the image acquisition controller 162 of the frame grabber card type. Therefore, in the embodiment, the 1D array image sensor 152 directly transmits the 3D image information constructed by the captured 1D, 2D or multiple 2D image information to the processor PR for subsequent data conversion without passing through the image acquisition controller 162*a*.

Referring to FIG. 6, a low coherence interferometry 100*b* of FIG. 6 is substantially similar to the low coherence interferometry 100 of FIG. 1A and the adopted signal control method is, for example, the same as that of FIG. 3B, and a main difference there between is that in the low coherence interferometry 100*b*, the image acquisition controller 162*b* in the signal control module 160*b* includes a microprocessor 1621 and a signal synthesizer 1622, where the signal synthesizer 1622 is coupled to the 1D array image sensor 152, the microprocessor 1621 and the signal controller 164, and the 1D array image sensor 152 is connected to the processor PR. In addition, the microcontroller 1621 is, for example, a single-chip or multi-chip microcontroller.

In the following paragraphs, differences between scanning and image acquisition of the low coherence interferometrys 100 and 100*b* of the embodiments of FIG. 1 and FIG. 6 are described in detail.

The methods of scanning and image acquisition of the low coherence interferometry 100*b* of FIG. 6 are substantially similar to that of the low coherence interferometry 100 of FIG. 1A, and a main difference there between is that the microprocessor 1621 may send the synchronization signal Sync to the signal synthesizer 1622 and the signal controller 164, where the synchronization signal Sync is the 1D image acquisition control signal IG1. The 2D image acquisition control signal IG2 sent by the signal controller 164 after receiving the synchronization signal Sync is transmitted to the signal synthesizer 1622. Therefore, the signal synthesizer 1622 receives the synchronization signal Sync and the 2D image acquisition control signal IG2 and synthesizes the same into the synthesized image acquisition control signal SGL, and the synthesized image acquisition control signal SGL is sent to the 1D array image sensor 152 to capture image information. Similarly, compared with the image acquisition controller 162 of the frame grabber card type, the microcontroller 1621 does not have the image preprocessing capability, an effect thereof is mainly to send the synchronization signal Sync (the 1D image acquisition control signal IG1), and its cost is lower than that of the image acquisition controller 162 of the frame grabber card type. Therefore, in the embodiment, the 1D array image sensor 152 directly transmits the 3D image information constructed by the captured 1D, 2D or multiple 2D image information to the processor PR for subsequent data conversion.

Referring to FIG. 7, a low coherence interferometry 100*c* of FIG. 7 is substantially similar to the low coherence interferometry 100 of FIG. 1A and the adopted signal control method is, for example, the same as that of FIG. 3A, and a main difference there between is that in the signal control module 160*c*, the image acquisition controller 162 and the signal controller 164 are integrated to a same chip 16*c*. Therefore, the 1D and 2D image acquisition control signals IG1 and IG2 and the scan element control signal SCL are synchronized with each other in timing, so that the problem of image error is not generated.

In summary, in the signal control module and the low coherence interferometry of the embodiments of the disclosure, the image acquisition controller and the signal controller respectively send 1D and 2D image acquisition control signals that are synchronized with each other in timing. To be specific, in an embodiment, the image acquisition controller and the signal controller respectively belong to different chips, the image acquisition controller sends the synchronization signal to the signal controller, and the signal controller sends the 2D image acquisition control signal to the image acquisition controller according to the synchronization signal, so that the 1D and 2D image capturing control signals are synchronized with each other. In another embodiment, the image acquisition controller may further synthesize the 1D and 2D image acquisition control signals to obtain a synthesized image acquisition control signal. In another embodiment, the image acquisition controller and the signal controller may also be integrated to a same chip, so that the problem of different timings of the two signals caused by different chip baseband signals is avoided, which may also make the 1D and 2D image acquisition control signals to be synchronized with each other. Therefore, when the 1D array image sensor is controlled by the 1D and 2D image acquisition control signals (or a synthesized image acquisition control signal synthesized from the 1D and 2D image acquisition control signals) to capture the image information of the object-to-be-tested, the problem of image error is less likely to occur, so that the low coherence interferometry of the embodiment of the disclosure has good image quality.

In addition, in applications based on repetitive 2D image scanning, such as optical coherence tomography angiography, after the above-mentioned 1D and 2D image acquisition control signals are synchronized, a physical scanning range on the object-to-be-tested for each repeated 2D image scanning is further the same, thereby improving the quality of imaging and enhancing a dynamic range of the image.

What is claimed is:

1. A signal control module, integrated to a low coherence interferometry, the low coherence interferometry comprising a one-dimensional array image sensor, the signal control module comprising:
   an image acquisition controller, configured to send a one-dimensional image acquisition control signal to control the one-dimensional array image sensor to capture one-dimensional image information of an object-to-be-tested; and
   a signal controller, coupled to the image acquisition controller, and configured to send a two-dimensional image acquisition control signal,
   wherein the image acquisition controller further sends a synchronization signal synchronized with the one-dimensional image acquisition control signal to the signal controller,
   wherein the one-dimensional image acquisition control signal and the two-dimensional image acquisition control signal are synchronized with each other in timing, and the one-dimensional array image sensor captures the one-dimensional image information of the object-to-be-tested at different positions along a direction according to the one-dimensional image acquisition control signal and the two-dimensional image acquisition control signal, and the one-dimensional image information corresponding to the different positions constitutes two-dimensional image information of the object-to-be-tested,
   wherein the image acquisition controller and the signal controller belong to different chips, wherein the signal controller sends the two-dimensional image acquisition control signal to the image acquisition controller according to the synchronization signal.

2. The signal control module as claimed in claim 1, wherein the image acquisition controller synthesizes a synthesized image acquisition control signal based on the one-dimensional image acquisition control signal and the two-dimensional image acquisition control signal, and transmits the synthesized image acquisition control signal to the one-dimensional array image sensor, the one-dimensional array image sensor captures the one-dimensional image information of the object-to-be-tested at the different positions in the one direction according to the synthesized image acquisition control signal.

3. The signal control module as claimed in claim 2, wherein the image acquisition controller performs a multiplication or logic operation on the one-dimensional image acquisition control signal and the two-dimensional image acquisition control signal to synthesize the synthesized image acquisition control signal.

4. The signal control module as claimed in claim 3, wherein the image acquisition controller further comprises a signal synthesizer and a microcontroller, wherein the microcontroller is configured to generate the synchronization signal, and the signal synthesizer synthesizes the synthesized image acquisition control signal based on the synchronization signal and the two-dimensional image acquisition control signal.

5. The signal control module as claimed in claim 1, wherein the image acquisition controller comprises a frame grabber card.

6. The signal control module as claimed in claim 1, wherein the image acquisition controller is a microcontroller.

7. The signal control module as claimed in claim 1, wherein the signal controller is a data acquisition card.

8. A low coherence interferometry, comprising:
   a low coherence light source, configured to emit an illumination light beam;
   a light splitting and combining element, disposed on a transmission path of the illumination light beam, the light splitting and combining element splitting the illumination light beam into a reference light beam and an object light beam, wherein an object-to-be-tested is located on a transmission path of the object light beam;
   a reflective element, disposed on a transmission path of the reference light beam;
   a scan element, disposed on the transmission path of the object light beam, and located between the light splitting and combining element and the object-to-be-tested, wherein the reference light beam is reflected by the reflective element and transmitted to the light splitting and combining element, and the object light beam is sequentially reflected by the scan element and the object-to-be-tested and then transmitted to the light splitting and combining element, the reflected reference light beam and the reflected object light beam are combined by the light splitting and combining element to form a synthesized light beam, wherein the scan element is configured to adjust a position where the object light beam irradiates the object-to-be-tested;
   a one-dimensional array image sensor, disposed on a transmission path of the synthesized light beam; and
   a signal control module, comprising:
      an image acquisition controller, coupled to the one-dimensional array image sensor, and configured to send a one-dimensional image acquisition control signal to control the one-dimensional array image sensor to capture one-dimensional image information of the object-to-be-tested;
      a signal controller, coupled to the image acquisition controller and the scan element, and configured to send a two-dimensional image acquisition control signal,
      wherein the image acquisition controller further sends a synchronization signal synchronized with the one-dimensional image acquisition control signal to the signal controller,
      wherein the one-dimensional image acquisition control signal and the two-dimensional image acquisition control signal are synchronized with each other in timing, and the one-dimensional array image sensor captures the one-dimensional image information of the object-to-be-tested at different positions along a direction according to the one-dimensional image acquisition control signal and the two-dimensional image acquisition control signal, and the one-dimensional image information corresponding to the different positions constitutes two-dimensional image information of the object-to-be-tested,
      wherein the image acquisition controller and the signal controller belong to different chips, wherein the signal controller sends the two-dimensional image acquisition control signal to the image acquisition controller according to the synchronization signal.

9. The low coherence interferometry as claimed in claim 8, wherein the image acquisition controller synthesizes a synthesized image acquisition control signal based on the one-dimensional image acquisition control signal and the two-dimensional image acquisition control signal, and transmits the synthesized image acquisition control signal to the one-dimensional array image sensor, the one-dimensional array image sensor captures the one-dimensional image information of the object-to-be-tested at the different positions in the one direction according to the synthesized image acquisition control signal.

10. The low coherence interferometry as claimed in claim 9, wherein the image acquisition controller performs a multiplication or logic operation on the one-dimensional image acquisition control signal and the two-dimensional image acquisition control signal to synthesize the synthesized image acquisition control signal.

11. The low coherence interferometry as claimed in claim 8, wherein the image acquisition controller comprises a frame grabber card.

12. The low coherence interferometry as claimed in claim 8, wherein the image acquisition controller is a microcontroller.

13. The low coherence interferometry as claimed in claim 8, wherein the image acquisition controller further comprises a signal synthesizer and a microcontroller, wherein the microcontroller is configured to generate the synchronization signal, and the signal synthesizer synthesizes the synthesized image acquisition control signal based on the synchronization signal and the two-dimensional image acquisition control signal.

14. The low coherence interferometry as claimed in claim 8, wherein the signal controller is a data acquisition card.

15. The low coherence interferometry as claimed in claim 8, wherein the signal controller sends a scan element control signal to the scan element according to the synchronization signal, and the scan element adjusts a transmission direction of the object light beam according to the scan element control signal so that the object light beam irradiates along the one direction on the object-to-be-tested.

16. The low coherence interferometry as claimed in claim 8, further comprising a processor, configured to receive and process the two-dimensional image information to form a two-dimensional image of the object-to-be-tested.

17. The low coherence interferometry as claimed in claim 8, wherein the one-dimensional array image sensor comprises a plurality of image sensing elements, and the image sensing elements are arranged along a direction.

* * * * *